Patented Sept. 25, 1945

2,385,412

UNITED STATES PATENT OFFICE 2,385,412

CAPSICUM-CONTAINING SEASONING COMPOSITION

Lloyd A. Hall, Chicago, Ill., assignor to The Griffith Laboratories, Inc., Chicago, Ill., a corporation of Illinois No Drawing. Application May 3, 1943, Serial No. 485,495

14 Claims. (Cl. 99—143)

The present invention relates to the manufacture of dry seasoning compositions. These are compositions which are commonly employed to season meat products, especially compounds of ground meat, such as sausage and like encased meats, meat loaves, hamburger steak and the like. In general they comprise a solid edible carrier, including soluble crystals, as all or part of the carrier, such as salt, or sugar, or mixed salt and sugar. Mixed with the carrier are seasoning ingredients of essential oils, or of oleoresins, or both, in kinds, quantities, and proportions varied for different types of meat products to be seasoned. Such seasoning compositions are well known and are described in numerous patents, but they present certain problems.

In my prior joint U. S. patents with C. L. Griffith, Nos. 1,995,119, 1,995,120, 1,995,121 and 2,032,612, one such problem is disclosed. Where oleoresin of capsicum is employed on a carrier base containing considerable sodium chloride as carrier, or as all the carrier, with or without essential oils, there is a tendency to bleaching of the color resulting from the presence of the capsicum. Said patents teach that an acid condition is generated from the sodium chloride which induces such bleaching. Oxidation in an acid medium appears to be involved, and the bleaching is greatly accelerated by light, by some photogenic action. In bottles, or in open exposed containers having the composition, the bleaching is so pronounced at the surfaces as to give the appearance of spoilage or of deterioration. Said patents show numerous ways of counteracting the tendency to bleach, all involving steps to introduce available alkalinity to neutralize the acidity as it may develop, whereby the bleaching is avoided.

In Patent No. 1,995,121, it is particularly taught that buffer salts are used, such as salts of strong bases with weak acids. These were used as crystals along with the carrier crystals. They function to destroy strong acidity, such as effects the bleaching, as by converting it to ineffective weak acidity, deriving from the said buffer salt.

It was disclosed in said patents that such bleaching of the color of oleoresin of capsicum does not occur when the carrier is cane sugar. Subsequent experience shows that it does occur when commercial corn sugar is employed as the carrier, but not to the same extent as occurs when sodium chloride is the carrier.

It is the object of the present invention to prevent the bleaching of oleoresin of capsicum in dry seasoning compositions containing sodium chloride, or corn sugar, or certain other sugars not cane sugar, in quantity normally leading to such bleaching.

It is a particular object to employ initially a buffer salt, or several such, as an anti-bleaching agent, not as crystals, but as a solution in water, and to counteract an adverse effect of the water by the use of a hygroscopic agent, to prevent caking of the composition on standing.

Various other and ancillary objects and advantages of the invention will appear from the following description and explanation of the invention.

Heretofore, the use of water has been avoided in making dry seasoning compositions having a high carrier content of crystals, such as sodium chloride or sugar, because of a tendency of the product to cake on standing. According to the present invention, I have improved the process and product of said prior Patent U. S. No. 1,995,121, by employing buffer salt in a strong solution in water, said buffer salt being a normal or acid salt of a strong base with a weak organic acid which salt is capable of action with acid in the composition to render acidity substantially non-effective to produce early bleaching. This permits less buffer salt to be as effective as, or more effective than, a corresponding amount of buffer salt in dry powdered form, as a component of the original mixture. However, the water of said solution leads to caking of the resulting mixture on standing, and from this standpoint, use of buffer salt solution alone, as anti-bleaching agent, is undesirable and in commercial practice impossible. This caking can be avoided by use of a suitable liquid hygroscopic agent such as glycerine, ethylene glycol, diethylene glycol, triethylene glycol, propylene glycol, dipropylene glycol, tripropylene glycol, and like compounds of liquid form having hygroscopic properties.

The use of a hygroscopic liquid in dry seasoning compositions is known and is described in the patent to C. L. Griffith, U. S. No. 1,971,910, wherein its function is to stabilize essential oil content against volatilization. In compositions of the present invention having essential oil content, this same function is employed, but an additional function is exercised in preventing caking.

The present invention extends the problem of bleaching to include corn sugar as a carrier which induces the bleaching action. Corn sugar, a commercial dextrose, is a product of the acid hydrolysis of corn starch, conducted with strong mineral acid. In the final product, crystallized commercial corn sugar, traces of the acid remain, as is well known. For the purposes of a carrier of oleoresin of capsicum, any dextrose resulting from an acid conversion process, which dextrose retains traces of strong mineral acid of the converting process, is not the equivalent of cane sugar, and requires a corrective, such as those referred to in the Griffith and Hall patents above mentioned, and as described herein.

As stated in Patent No. 1,995,121, the preferred weak acids are edible ones, such as citric or tartaric, but others, such as carbonic, acetic, malic, and lactic acids, may be used. The buffer salts are made with strong bases, such as metals or ammonium, which are harmless in the quantity used, permissible ones being exemplified by ammonium, lithium, sodium, potassium, magnesium and calcium. Both normal and acid salts may be employed. But in the present invention requiring a solution in water of the buffer salt, only the water-soluble normal or acid salts are contemplated. Preferably, the alkali metals, such as potassium, and sodium, and ammonium, are used as the normal salts of the acids, although the acid salts may be used, or the mixed salts, such as Rochelle's salts.

Salts of the character described react with the acid initially present, or formed, either in the oleoresins or oils, or as a result of action of such acids on the chloride, or on the acid deriving from the sugar. The acids take the strong base from the corrective salt and set free the weak organic acid, or change a normal salt to an acid salt, or change one acid salt to a more acid salt. The weak acids, or the acidities of the acid salts, are insufficient to permit bleaching conditions to arise, or the acids are destroyed so that an acid condition does not accumulate. By using these salts, the mass may be made stable against bleaching, while having measurable acidity. Salts having ammonium base in whole or in part have shown slightly better results than salts with only metal base. Traces of gaseous ammonia from hydrolysis may account for such difference.

EXAMPLE 1

(a) Buffer solution:
   Normal sodium citrate
      ($2Na_3C_6H_5O_7.11H_2O$) _____grams__ 100
   Dibasic ammonium citrate
      ($H(NH_4)_2C_6H_5O_7$) _____do____ 100
   Ammonium hydroxide to give pH 7.02
   Water to give ____cubic centimeters___ 344
(b) Sodium chloride _____pounds__ 113
(c) Oleoresin of capsicum _____do____ 1.77
(d) Propylene glycol _____do____ 0.8

EXAMPLE 2

(a) Buffer solution (pH of 8.23)
                    cubic centimeters__ 182
   Normal sodium citrate
      ($2Na_3C_6H_5O_7.11H_2O$) _____grams__ 100
   Water _____cubic centimeters___ 140
(b) Sodium chloride _____pounds__ 57
(c) Oleoresin of capsicum _____do____ .89
(d) Propylene glycol _____do____ .42

EXAMPLE 3

(a) Buffer solution:
   Dibasic ammonium citrate
      ($H(NH_4)_2C_6H_5O_7$) _____grams__ 100
   Ammonium hydroxide to give pH of 7.3
   Water to give ____cubic centimeters__ 94
(b) Sodium chloride _____pounds__ 29.4
(c) Oleoresin of capsicum _____do____ .46
(d) Propylene glycol _____do____ .215

EXAMPLE 4

(a) Buffer solution ____cubic centimeters__ 148
   Dibasic ammonium citrate
      ($H(NH_4)_2C_6H_5O_7$) _____grams__ 100
   Water _____cubic centimeters___ 100
(b) Sodium chloride _____pounds__ 56.6
(c) Oleoresin of capsicum _____do____ .91
(d) Glycerine _____do____ .4

EXAMPLES 5 TO 8

Corn sugar is used in place of sodium chloride in each of the examples above, in the same amount as the sodium chloride carrier.

EXAMPLES 9 TO 12

The Examples 1 to 4 are changed to replace half the sodium chloride carrier thereof with as much corn sugar.

To all the above examples, essential oils, or other oleoresins, or both, may be added.

All the compositions remain stable in color over an appreciable period of time during which time similar samples lacking buffer salt solution bleach out at the surface, when exposed to light in glass bottles. All the samples are not necessarily of the same original color, since the components of the mixture to a degree initially determine the color resulting from the presence of the oleoresin of capsicum. The actual pH of the initial compositions may vary, and may change slightly as the compositions age. A control has been used, lacking buffer salt. The pH values of Examples 1, 2 and 3, and of the control, are shown in the following table.

*Salt base*

| pH | Ex. 1 | Ex. 2 | Ex. 3 | Control |
|---|---|---|---|---|
| Original | 6.08 | 6.12 | 6.33 | 6.1 |
| In 20 days | 5.85 | 5.95 | 6.22 | 4.15 |

In Example 2, the amount of sodium citrate is .425% of the sodium chloride used. In Example 2 of said Patent No. 1,995,121, the sodium citrate is 2% of the sodium chloride, larger amounts being required for the effect because solid crystals were employed. The following example is a modification of said example, of said prior patent, based upon the present invention.

EXAMPLE 13

Parts by weight
Sodium chloride _____ 250
Sodium citrate crystals (as a saturated
   aqueous solution) _____ 1
Glycerine _____ 51
Oleoresin of capsicum _____ 3.50
Oleoresin of ginger _____ .19
Essential oils of spices _____ 3.19

Example 13 has 1 part of the sodium citrate and the attendant water of the saturated solution, whereas Example 2 of No. 1,995,121 has 5 parts of sodium citrate without the water. In the present Example 13, the glycerine exercises a function whereby it, or an equivalent, is essential, and not merely optional, as in No. 1,995,121.

Numerous changes and modifications of the invention are contemplated as falling within the scope of the appended claims.

I claim:
1. The method of making a dry seasoning composition having an oleoresin of capsicum on a solid carrier, which comprises incorporating into a single mixture: crystals of a solid carrier material selected from the group consisting of sodium chloride and dextrose of an acid-conversion process which dextrose carries an impurity of strong mineral acid in trace amount, said carrier material normally giving rise to a strong mineral acid condition in an uninhibited combination therewith of oleoresin of capsicum which condition induces early bleaching of the color resulting from the initial presence of said oleoresin; seasoning material selected from the group consisting of oleoresin of spices and essential oils, including as a necessary seasoning material oleoresin of capsicum; a moistening quantity of an aqueous solution providing a bleaching-inhibiting quantity of edible buffer salt selected from the group consisting of water-soluble normal and acid salts of strong bases with weak organic acids; and a caking-inhibiting quantity of edible liquid hygroscopic agent; the water of said solution serving to distribute the buffer salt thereof throughout the mixture; the hygroscopic agent serving to prevent the water of said solution leading to caking of the mixture on standing; and said buffer salt serving to inhibit bleaching of the composition by reaction with strong mineral acid forming available and weak organic acidity.

2. The method of making a dry seasoning composition having an oleoresin of capsicum on a solid carrier, which comprises incorporating into a single mixture: sodium chloride crystals as carrier material, said carrier material normally giving rise to a strong mineral acid condition in an uninhibited combination therewith of oleoresin of capsicum which condition induces early bleaching of the color resulting from the initial presence of said oleoresin; seasoning material selected from the group consisting of oleoresins of spices and essential oils, including as a necessary seasoning material oleoresin of capsicum; a moistening quantity of an aqueous solution providing a bleaching-inhibiting quantity of edible buffer salt selected from the group consisting of water-soluble normal and acid salts of strong bases with weak organic acids; and a caking-inhibiting quantity of edible liquid hygroscopic agent; the water of said solution serving to distribute the buffer salt thereof throughout the mixture; the hygroscopic agent serving to prevent the water of said solution leading to caking of the mixture on standing; and said buffer salt serving to inhibit bleaching of the composition by reaction with strong mineral acid forming available and weak organic acidity.

3. The method of making a dry seasoning composition having an oleoresin of capsicum on a solid carrier, which comprises incorporating into a single mixture: crystals of a solid carrier material selected from the group consisting of sodium chloride and dextrose of an acid-conversion process which dextrose carries an impurity of strong mineral acid in trace amount, said carrier material normally giving rise to a strong mineral acid condition in an uninhibited combination therewith of oleoresin of capsicum which condition induces early bleaching of the color resulting from the initial presence of said oleoresin; seasoning material selected from the group consisting of oleoresins of spices and essential oils, including as a necessary seasoning material oleoresin of capsicum; a moistening quantity of a substantially saturated solution of edible buffer salt selected from the group consisting of normal and acid salts of strong bases with weak organic acids; and a caking-inhibiting quantity of edible liquid hygroscopic agent; the water of said solution serving to distribute the buffer salt thereof throughout the mixture; the hygroscopic agent serving to prevent the water of said solution leading to caking of the mixture on standing; and said buffer salt serving to inhibit bleaching of the composition by reaction with strong mineral acid forming available and weak organic acidity.

4. The method of making a dry seasoning composition having an oleoresin of capsicum on a solid carrier, which comprises incorporating into a single mixture: sodium chloride crystals as carrier material, said carrier material normally giving rise to a strong mineral acid condition in an uninhibited combination therewith of oleoresin of capsicum which condition induces early bleaching of the color resulting from the initial presence of said oleoresin; seasoning material selected from the group consisting of oleoresins of spices and essential oils, including as a necessary seasoning material oleoresin of capsicum; a moistening quantity of a substantially saturated solution of edible buffer salt selected from the group consisting of normal and acid salts of strong bases with weak organic acids; and a caking-inhibiting quantity of edible liquid hygroscopic agent; the water of said solution serving to distribute the buffer salt thereof throughout the mixture; the hygroscopic agent serving to prevent the water of said solution leading to caking of the mixture on standing; and said buffer salt serving to inhibit bleaching of the composition by reaction with strong mineral acid forming available and weak organic acidity.

5. In the process of mixing seasoning materials with carrier crystals selected from the group consisting of sodium chloride and dextrose of an acid-conversion process which dextrose carries an impurity of strong mineral acid in trace amount, to form a dry soluble seasoning composition containing also edible buffer salt selected from the group consisting of water-soluble normal and acid salts of strong bases with weak organic acids which are effective to prevent bleaching of the color due to the initial presence of oleoresin of capsicum by reaction with any strong mineral acidity to convert it into equivalent weak organic acidity; the steps of dissolving the selected buffer salt in water to form a strong solution, mixing into said composition as an essential ingredient thereof, a moistening quantity of said solution, and also a caking-inhibiting quantity of edible liquid hygroscopic agent.

6. A dry seasoning composition in granular form comprising essentially carrier crystals selected from the group consisting of sodium chloride and dextrose of an acid-conversion process which dextrose carries an impurity of strong mineral acid in trace amount, flavoring material dispersed throughout and carried by said crystals including a coloring quantity of oleoresin of capsicum, a moistening quantity of aqueous solution providing a bleaching-inhibiting amount of edible buffer salt selected from the group consisting of water-soluble normal and acid salts of strong bases with weak organic acids, and a caking-inhibiting quantity of edible liquid hygroscopic agent, said buffer salt serving in the composition to convert bleach-inducing strong mineral acid to non-bleach-inducing weak organic acidity.

7. A dry seasoning composition in granular form comprising essentially carrier crystals of sodium chloride, flavoring material dispersed throughout and carried by said crystals including a coloring quantity of oleoresin of capsicum, a moistening quantity of aqueous solution providing a bleaching-inhibiting amount of edible buffer salt selected from the group consisting of water-soluble normal and acid salts of strong bases with weak organic acids, and a caking-inhibiting quantity of edible liquid hygroscopic agent, said buffer salt serving in the composition to convert bleach-inducing strong mineral acid to non-bleach-inducing weak organic acidity.

8. The method of making a dry seasoning composition having an oleoresin of capsicum on a solid carrier, which comprises incorporating into a single mixture: crystals of a solid carrier material selected from the group consisting of sodium chloride and dextrose of an acid-conversion process which dextrose carries an impurity of strong mineral acid in trace amount, said carrier material normally giving rise to a strong mineral acid condition in an uninhibited combination therewith of oleoresin of capsicum which condition induces early bleaching of the color resulting from the initial presence of said oleoresin; seasoning material selected from the group consisting of oleoresins of spices and essential oils, including as a necessary seasoning material oleoresin of capsicum; a moistening quantity of an aqueous solution providing a bleaching-inhibiting quantity of edible buffer salts selected from the group consisting of water-soluble normal and acid citrate salts of alkali metals and ammonium; and a caking-inhibiting quantity of edible liquid hygroscopic agent; the water of said solution serving to distribute the buffer salt thereof throughout the mixture; the hygroscopic agent serving to prevent the water of said solution leading to caking of the mixture on standing; and said buffer salt serving to inhibit bleaching of the composition by reaction with strong mineral acid forming available and weak organic acidity.

9. The method of making a dry seasoning composition having an oleoresin of capsicum on a solid carrier, which comprises incorporating into a single mixture: sodium chloride crystals as carrier material, said carrier material normally giving rise to a strong mineral acid condition in an uninhibited combination therewith of oleoresin of capsicum which condition induces early bleaching of the color resulting from the initial presence of said oleoresin; seasoning material selected from the group consisting of oleoresins of spices and essential oils, including as a necessary seasoning material oleoresin of capsicum; a moistening quantity of an aqueous solution providing a bleaching-inhibiting quantity of edible buffer salts selected from the group consisting of water-soluble normal and acid citrate salts of alkali metals and ammonium; and a caking-inhibiting quantity of edible liquid hygroscopic agent; the water of said solution serving to distribute the buffer salt thereof throughout the mixture; the hygroscopic agent serving to prevent the water of said solution leading to caking of the mixture on standing; and said buffer salt serving to inhibit bleaching of the composition by reaction with strong mineral acid forming available and weak organic acidity.

10. A dry seasoning composition in granular form comprising essentially carrier crystals selected from the group consisting of sodium chloride and dextrose of an acid-conversion process which dextrose carries an impurity of strong mineral acid in trace amount, flavoring material dispersed throughout and carried by said crystals including a coloring quantity of oleoresin of capsicum, a moistening quantity of aqueous solution providing a bleaching-inhibiting amount of edible buffer salt selected from the group consisting of water-soluble normal and acid citrate salts of alkali metals and ammonium, and a caking-inhibiting quantity of edible liquid hygroscopic agent, said buffer salt serving in the composition to convert bleach-inducing strong mineral acid to non-bleach-inducing weak organic acidity.

11. A dry seasoning composition in granular form comprising essentially carrier crystals of sodium chloride, flavoring material dispersed throughout and carried by said crystals including a coloring quantity of oleoresin of capsicum, a mostening quantity of aqueous solution providing a bleaching-inhibiting amount of edible buffer salt selected from the group consisting of water-soluble normal and acid citrate salts of alkali metals and ammonium and a caking-inhibiting quantity of edible liquid hygroscopic agent, said buffer salt serving in the composition to convert bleach-inducing strong mineral acid to non-bleach-inducing weak organic acidity.

12. The method of making a dry seasoning composition having an oleoresin of capsicum on a solid carrier, which comprises incorporating into a single mixture: corn sugar crystals of an acid-conversion process as carrier material which sugar is characterized by carried trace amounts of strong mineral acid, said carrier material normally giving rise to a strong mineral acid condition in an uninhibited combination therewith of oleoresin of capsicum which condition induces early bleaching of the color resulting from the initial presence of said oleoresin; seasoning material selected from the group consisting of oleoresins of spices and essential oils, including as a necessary seasoning material oleoresin of capsicum; a moistening quantity of an aqueous solution providing a bleaching-inhibiting quantity of edible buffer salt selected from the group consisting of water-soluble normal and acid salts of strong bases with weak organic acids; and a caking-inhibiting quantity of edible liquid hygroscopic agent; the water of said solution serving to distribute the buffer salt thereof throughout the mixture, the hygroscopic agent serving to prevent the water of said solution leading to caking of the mixture on standing; and said buffer salt serving to inhibit bleaching of the composition by reaction with strong mineral acid forming available and weak organic acidity.

13. The method of making a dry seasoning composition having an oleoresin of capsicum on a solid carrier, which comprises incorporating into a single mixture: corn sugar crystals of an acid-conversion process as carrier material which sugar is characterized by carried trace amounts of strong mineral acid; said carrier material normally giving rise to a strong mineral acid condition in an uninhibited combination therewith of oleoresin of capsicum which condition induces early bleachng of the color resulting from the initial presence of said oleoresin; seasoning material selected from the group consisting of oleoresins of spices and essential oils, including as a necessary seasoning material oleoresin of capsicum; a moistening quantity of a substantially saturated solution of edible buffer salt selected from the group consisting of normal and acid salts of strong bases with weak organic acids; and a caking-inhibiting quantity of edible liquid hygroscopic agent; the water of said solution serving to distribute the buffer salt thereof throughout the mixture; the hygroscopic agent serving to prevent the water of said solution leading to caking of the mixture on standing; and said buffer salt serving to inhibit bleaching of the composition by reaction with strong mineral acid forming available and weak organic acidity.

14. A dry seasoning composition in granular form comprising essentially carrier crystals of corn sugar of an acid-conversion process which sugar is characterized by carried trace amounts of strong mineral acid, flavoring material dispersed throughout and carried by said crystals including a coloring quantity of oleoresin of capsicum, a moistening quantity of aqueous solution providing a bleaching-inhibiting amount of edible buffer salt selected from the group consisting of water-soluble normal and acid salts of strong bases with weak organic acids, and a caking inhibiting quantity of edible liquid hygroscopic agent, said buffer salt serving in the composition to convert bleach-inducing strong mineral acid to non-bleach-inducing weak organic acidity.

LLOYD A. HALL.